United States Patent [19]
Ranjan et al.

[11] Patent Number: 6,005,412
[45] Date of Patent: Dec. 21, 1999

[54] AGP/DDR INTERFACES FOR FULL SWING AND REDUCED SWING (SSTL) SIGNALS ON AN INTEGRATED CIRCUIT CHIP

[75] Inventors: Nalini Ranjan, Sunnyvale; Xiaoyi Guo, Santa Clara, both of Calif.

[73] Assignee: S3 Incorporated, Santa Clara, Calif.

[21] Appl. No.: 09/057,047

[22] Filed: Apr. 8, 1998

[51] Int. Cl.[6] .............................................. H03K 19/0175
[52] U.S. Cl. ................................. 326/63; 326/38; 326/96; 326/86
[58] Field of Search ................................. 326/37, 38, 82, 326/83, 86, 90, 93, 95, 96, 98

[56] References Cited

U.S. PATENT DOCUMENTS

| | | | |
|---|---|---|---|
| 5,017,813 | 5/1991 | Galbraith et al. | 326/38 |
| 5,530,379 | 6/1996 | Konishi et al. | 326/68 |
| 5,646,553 | 7/1997 | Mitchell et al. | 326/37 |
| 5,736,867 | 4/1998 | Keiser et al. | 326/38 |
| 5,804,987 | 9/1998 | Ogawa et al. | 326/37 |

*Primary Examiner*—Michael Tokar
*Assistant Examiner*—Don Phu Le

*Attorney, Agent, or Firm*—Fenwick & West LLP

[57] ABSTRACT

An I/O interface includes latches, clocks, and conditioning circuits implemented in a custom physical layout to produce a reliable and flexible interface to high frequency busses running a plurality of protocols and signal specifications. Three clock trees are used to synchronize the buffering and conditioning of input/output signals before sending such signals to a pad or core. The clock trees are implemented via custom layouts to allow tight control of clock/strobe parameters (e.g., skew, duty cycle, rise/fall times). Two of the clock trees are local to the I/O interface and trigger a plurality of output latches configured on-the-fly to buffer output data signals from the core in asynchronous or synchronous mode. In the synchronous mode, a clock/strobe could be either edge-centered or window-strobe with respect to the data. The third clock tree distributes clock/strobes from an external source and is used to trigger a plurality of input latches configured on-the-fly to buffer input data from the pad in either a window-strobe mode or an edge-centered mode. The I/O interface also includes conditioning circuits that condition the I/O signals to be compliant with AGP/DDR protocols, as well as, full swing, reduced swing (SSTL), and TTL signal specifications.

15 Claims, 13 Drawing Sheets

AGP/DDR INTERFACES FOR FULL SWING AND REDUCED SWING (SSTL) SIGNALS ON AN INTEGRATED CIRCUIT CHIP

FIELD OF THE INVENTION

The present invention relates generally to interfaces for integrated circuits and, more particularly, to input/output (I/O) interfaces that can be configured on-the-fly to comply with multiple protocols and signal specifications.

BACKGROUND OF THE INVENTION

Since the advent of integrated circuits, I/O interfaces have been used for the purpose of interfacing internal (i.e., on-chip) circuits to external (i.e., off-chip) circuits. I/O interfaces typically are designed using asynchronous circuits which operate without a clock. As the frequency of signals through the interface increases, however, it becomes more difficult to capture and transmit signals using asynchronous circuits. In an asynchronous circuit, signals ripple through the system, set and reset flip-flops, and produce an output at some unpredictable future time dependent on system propagation delays. Because signals can happen at any time, asynchronous circuits are prone to being upset by noise in the system. For example, a noise burst on a signal line between clock pulses could cause a number of flip-flops to change state and cause a system malfunction.

In contrast, synchronous circuits, such as edge-triggered "D" flip-flops, can be used to reliably capture and transmit signals on either the positive-edge or the negative-edge of a clock pulse or strobe. A noise burst on a signal line between clock pulses does not typically upset a synchronous circuit. While synchronous circuits have been included in I/O interfaces for testing purposes (e.g., scan testing), they are not typically used to capture data signals communicated between core logic and pads in an integrated circuit chip. To reliably capture such data signals, synchronous circuits must have clocks that abide by a variety of constraints including skew, duty cycle, and setup/hold times. If these clock parameters are violated, the synchronous circuits could malfunction (e.g., clock race, latch-up) resulting in erroneous data signals being captured and transmitted. To reduce the probability of synchronous circuits malfunctioning, such circuits can be designed using custom physical layouts.

Custom physical layouts place physical placement control and constraints on the components of the I/O interface so as to restrict the variability of critical parameters, thereby ensuring reliable high frequency operation. By designing components to have a tight relationship to each other, any uncertainty in the operation and/or compensation of such components can be minimized. For example, clock and data paths can be accurately matched as well as designed to compensate for simultaneous switching push-out.

In addition to reliability concerns, it is also desirable that I/O interfaces be configurable on-the-fly to comply with multiple protocols and signal specifications including: Accelerated Graphics Port (AGP), Double Data Rate (DDR), Peripheral Component Interconnect (PCI), Stob Serial Terminated Logic (SSTL), and Transistor-to-Transistor Logic (TTL). Such I/O interfaces provide additional flexibility to system designers.

Accordingly, there is a need for reliable and flexible I/O interfaces for buffering and conditioning data signals between core logic and pads in integrated circuit chips. It is desirable that these I/O interfaces be configurable on-the-fly to comply with multiple protocols and signal specifications. Such I/O interfaces should have custom physical layouts of circuitry, power, and clock bussing to eliminate problems associated with, for example, uneven layout traces.

SUMMARY OF THE INVENTION

The present invention is directed to reliable I/O interfaces for an integrated circuit chip that can be configured on-the-fly to comply with a plurality of protocols and signal specifications.

An I/O interface of the present invention preferably includes latches, clocks, and conditioning circuits implemented in a custom physical layout to produce reliable and flexible interfaces to high frequency busses running a plurality of protocols and signal specifications. Three clock trees are used to synchronize the buffering and conditioning of input/output signals before sending such signals to a pad or core. The clock trees are implemented via custom layouts to allow tight control of clock/strobe parameters (e.g., skew, duty cycle, rise/fall times).

Two of the clock trees are local to the I/O interface and trigger a plurality of output latches configured on-the-fly to buffer output data signals from the core in either asynchronous or synchronous format. In the synchronous mode, a clock/strobe could be either edge-centered or window-strobe with respect to the data. The third clock tree distributes clock/strobes from an external source and is used to trigger a plurality of input latches configured on-the-fly to buffer input data from the pad in either a window-strobe mode or an edge-centered mode. The I/O interface also includes conditioning circuits that condition the I/O signals to be compliant with AGP/DDR protocols, as well as, full swing, reduced swing (SSTL), and TTL specifications The present invention places signals on the external bus at either the positive-edge or negative-edge of external clock/strobe pulses (i.e., single data rate) or both edges of external clock/strobe pulses using either internal clocks/strobes that are operating at twice the frequency (e.g., double data rate) or internal clocks/strobes that are operating at the same frequency as the external clocks.

In one embodiment of the present invention, an I/O interface for an integrated circuit chip includes a core, a pad, and a data buffer disposed between the core and the pad. The data buffer comprises an output circuit and an input circuit. The output circuit includes a plurality of output latches, two output clock trees, and a first signal conditioning circuit. Each output latch has an input coupled to receive output data signals from the core. Each output clock tree is coupled to at least one of the output latches for triggering the latching of the output data signals from the core. The first signal conditioning circuit is coupled to the output latches for conditioning the output data signals so that the output data signals are compliant with at least one of a plurality of protocols.

The input circuit includes a plurality of input latches, an input clock tree, and a second signal conditioning circuit. Each input latch has an input coupled to receive input data signals from the pad. The input clock is coupled to at least one of the input latches for triggering the latching of the input data signals from the pad. The second signal conditioning circuit is coupled to the input latches for conditioning the input data signals so that the input data signals are compliant with at least one of the plurality of protocols.

In another embodiment of the present invention, an I/O interface for an integrated circuit chip includes a core, a pad, and a clock/strobe buffer disposed between the core and the pad. The clock/strobe buffer generally includes a differential amplifier, a programmable delay module, and a gated buffer.

The differential amplifier is coupled to the pad for receiving AGP and DDR/SSTL signals. The programmable delay module is coupled to the differential amplifier for delaying the AGP and DDR/SSTL signals. The gated buffer is coupled to the programmable delay module and an input clock tree. The gated buffer is for distributing the AGP and DDR/SSTL signals to the I/O interface via the input clock tree.

In another embodiment of the present invention, a clock/strobe buffer includes an output circuit and an input circuit. The output circuit generally includes an output latch, a multiplexer, and a first conditioning circuit. The output latch has an input coupled to receive output clock/strobe signals from the core. The output latch also has an input coupled to a first output clock tree for triggering the latching of output clock/strobe signals from the core. The first output clock tree is disposed in the I/O interface. The multiplexer has an input coupled to a second output clock tree. The multiplexer reduces the skew on the output clock/strobe signals. The second output clock tree is also disposed in the I/O interface. The first signal conditioning circuit is coupled to the output latch and the multiplexer. The first signal conditioning circuit conditions the output clock/strobe signals so that the output clock/strobe signals are compliant with at least one of a plurality of protocols.

The input circuit includes a differential amplifier and a gated buffer. The differential amplifier has an input coupled to the pad for receiving differential clock/strobe signals complying with one of a plurality of protocols. The gated buffer is coupled to the differential amplifier and an input clock tree for distributing the clock/strobe signals via the input clock tree.

An advantage of the present invention is to provide synchronous data capture from the core or pad. Using a clock to synchronize data capture from the core or pad increases the reliability of such data capture when operating in AGP or DDR/SSTL modes.

Another advantage of the present invention is that data can be output to a bus at both edges of a external clock without using an internal clock that operates at twice the frequency of the external clock.

Another advantage of the present invention is that physical placement control and constraints are placed on each of the components of the I/O interface, thereby limiting process variations in components that can adversely effect reliable high frequency operation.

Still another advantage of the present invention is that the components of the I/O interface are tightly related, thereby minimizing uncertainty in the operation and/or compensation of each component. For example, clock and data paths can be accurately matched while compensating for simultaneous switching push-out.

These and other features, aspects, and advantages of the present invention will become better understood with regard to the following description, appended claims, and accompanying drawings.

DETAILED DESCRIPTION OF THE INVENTION

Figure 1A:
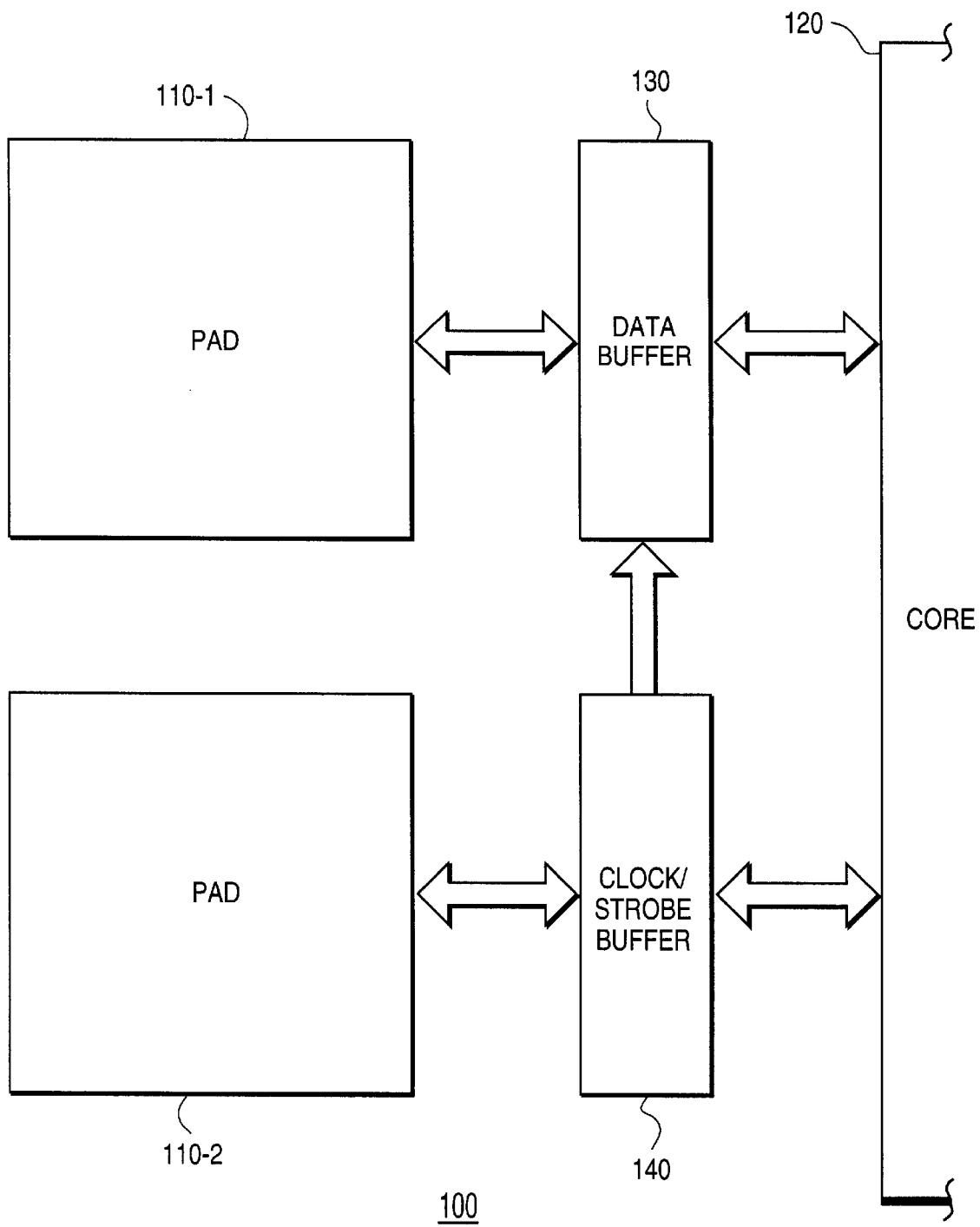
FIG. 1A is a functional block diagram illustrating one embodiment of an I/O interface for an integrated circuit including a data buffer and a clock/strobe buffer in accordance with the present invention.

It is noted that the term protocol, as used herein, includes operation modes and interface specifications (e.g., signal, electrical). The term signal(s), as used herein, includes data signals, clock/strobe signals, power signals, and control signals. The term "on-the-fly," as used herein, includes real-time operation of the integrated circuit chip (e.g., during the execution of user applications). The term clock/strobe, as used herein, includes both clocks and strobes.

Referring to FIG. 1, there is shown a functional block diagram of one embodiment of an I/O interface 100 for an integrated circuit chip in accordance with the present invention. The I/O interface 100 includes pads 110-1 and 110-2, a core 120, a data buffer 130, and a clock/strobe buffer 140.

The data buffer 130 preferably is part of a custom designed I/O cell disposed in an I/O ring of the integrated circuit chip (not shown). While only one I/O interface 100 is shown in FIG. 1, it is noted that multiple I/O cells having multiple I/O interfaces can be duplicated and disposed within the I/O ring.

The data buffer 130 preferably is coupled to the pad 110-1, the core 120, and the clock/strobe buffer 140, for buffering and conditioning signals communicated between the pad 110-1 and the core 120. The data buffer 130 may be configured on-the-fly to condition signals to comply with a particular protocol. These protocols preferably include: AGP, DDR, PCI, SSTL, and TTL. Alternatively, the data buffer 130 may be configured at a board design stage.

The clock/strobe buffer 140 preferably is part of a custom designed I/O cell disposed in the I/O ring of the integrated circuit chip. The clock/strobe buffer 140 is coupled to the pad 110-2, the core 120, and the data buffer 130, for buffering and conditioning clocks/strobes used to trigger events in the data buffer 130. The clock/strobe buffer 140 may be configured on-the-fly to condition internal and external clocks/strobes for use by the data buffer 130.

The data buffer 130 and the clock/strobe buffer 140 are preferably implemented using 0.25u CMOS technology as described in further detail below. Some of the benefits of implementing the data buffer 130 using 0.25u CMOS technology include: (a) the ability to group together I/O pads of the same bus to control the skews in the group, (b) the ability to control layout traces for clock/strobe signals, (c) the ability to shield the signals $V_{BIAS}$ and $V_{REF}$ (described below), (d) the ability to control the power/ground supply to minimize delay, skew, and imbalance, and (e) the ability to configure the data buffer 130 and the clock/strobe buffer to meet different operation modes and different interface specifications.

Figure 1B:
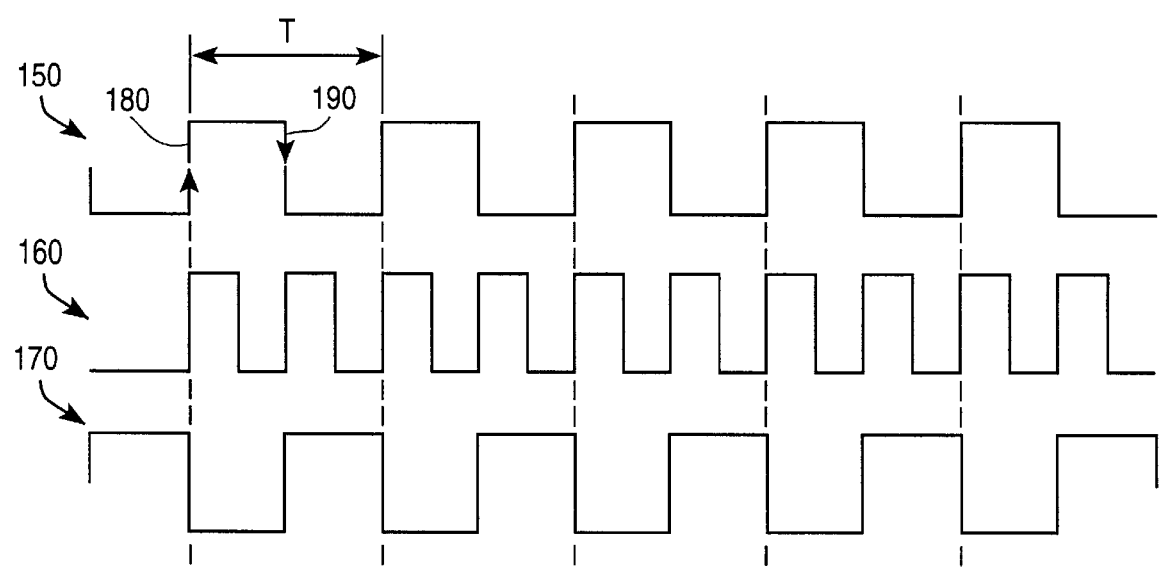
FIG. 1B is a set of timing diagrams illustrating clocks which may be used by the data buffer 130 to capture data signals from the core or pad in FIG. 1A.

Referring to FIG. 1B, there is shown a set of timing diagrams illustrating clocks which may be used by the data buffer 130 to capture data signals from the core or pad in FIG. 1A.

A first timing diagram illustrates a single rate clock 150 (hereinafter also referred to as "CCK_1X"). The single rate clock 150 has a period T and may be used to synchronize events in the data buffer 130 at a frequency of 66 MHz (PCI/TTL or "1X" AGP) or 150 MHz (DDR/SSTL). The positive-edge 180 and/or the negative-edge 190 of a pulse of the single rate clock 150 may be used to synchronize events.

A second timing diagram illustrates a double rate clock 160 (hereinafter also referred to as "DCK_2X"). The double rate clock 160 has a period T/2 and may be used to synchronize events in the data buffer 130 at a frequency of 133 MHz ("2X" AGP). The double rate clock 160 provides two positive-edges for every pulse of the single rate clock 150.

A third timing diagram illustrates a delayed clock 170. The delayed clock 170 is delayed by T/4 and is another embodiment of the double rate clock 160. The combination of the single rate clock 150 and the delayed clock 170 provides two positive-edges that may be used to synchronize events in the data buffer 130 at a frequency of 300 MHz. The combination of clock 150 and clock 170 enables data signals to be output to a bus at twice the frequency of the single rate clock 150 without using an internal clock that operates at twice the frequency of the external clock.

Figure 2A:
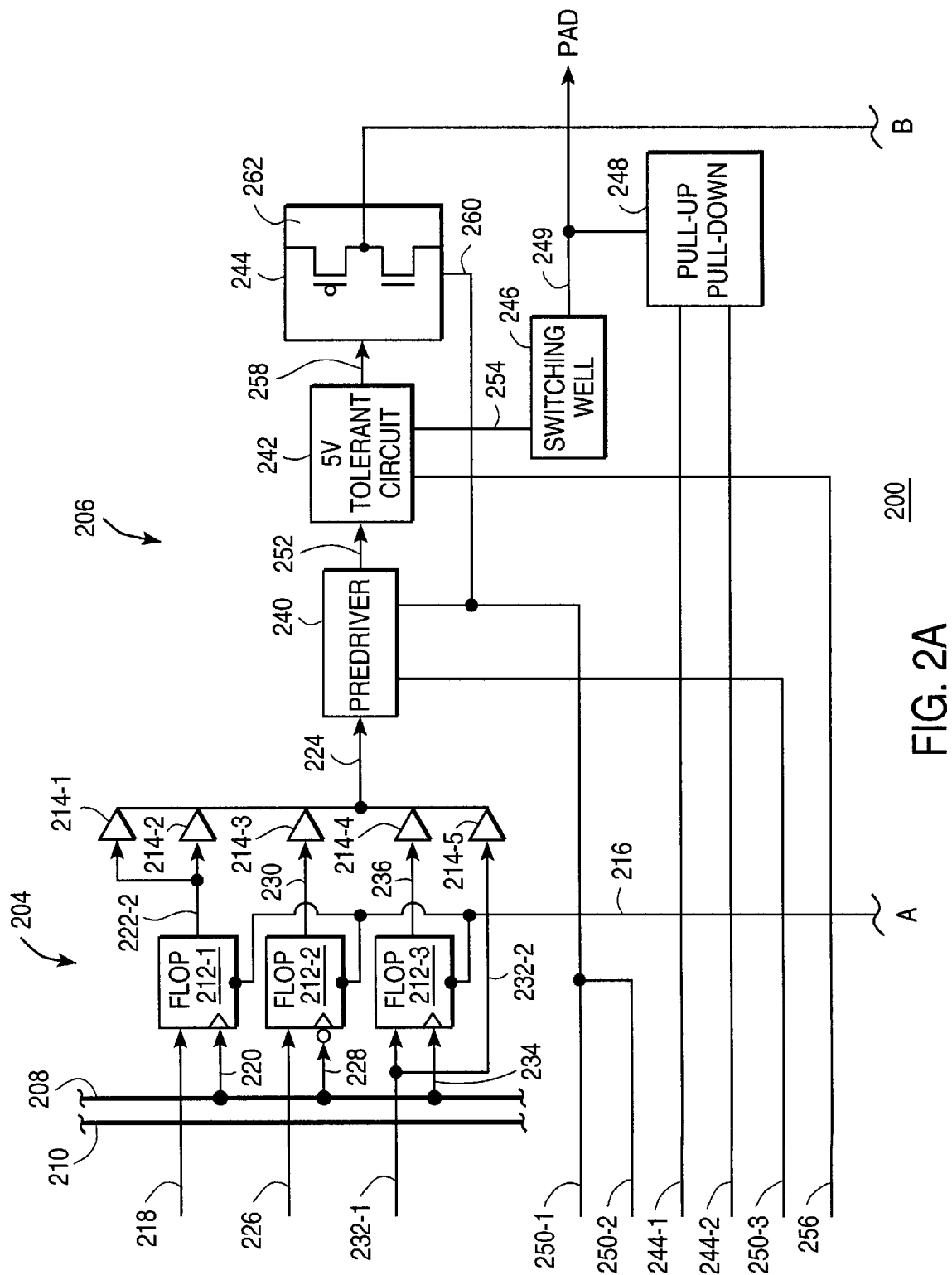
FIGS. 2A and 2B are functional block diagrams of one embodiment of the data buffer in FIG. 1A in accordance with the present invention.
Figure 2B:
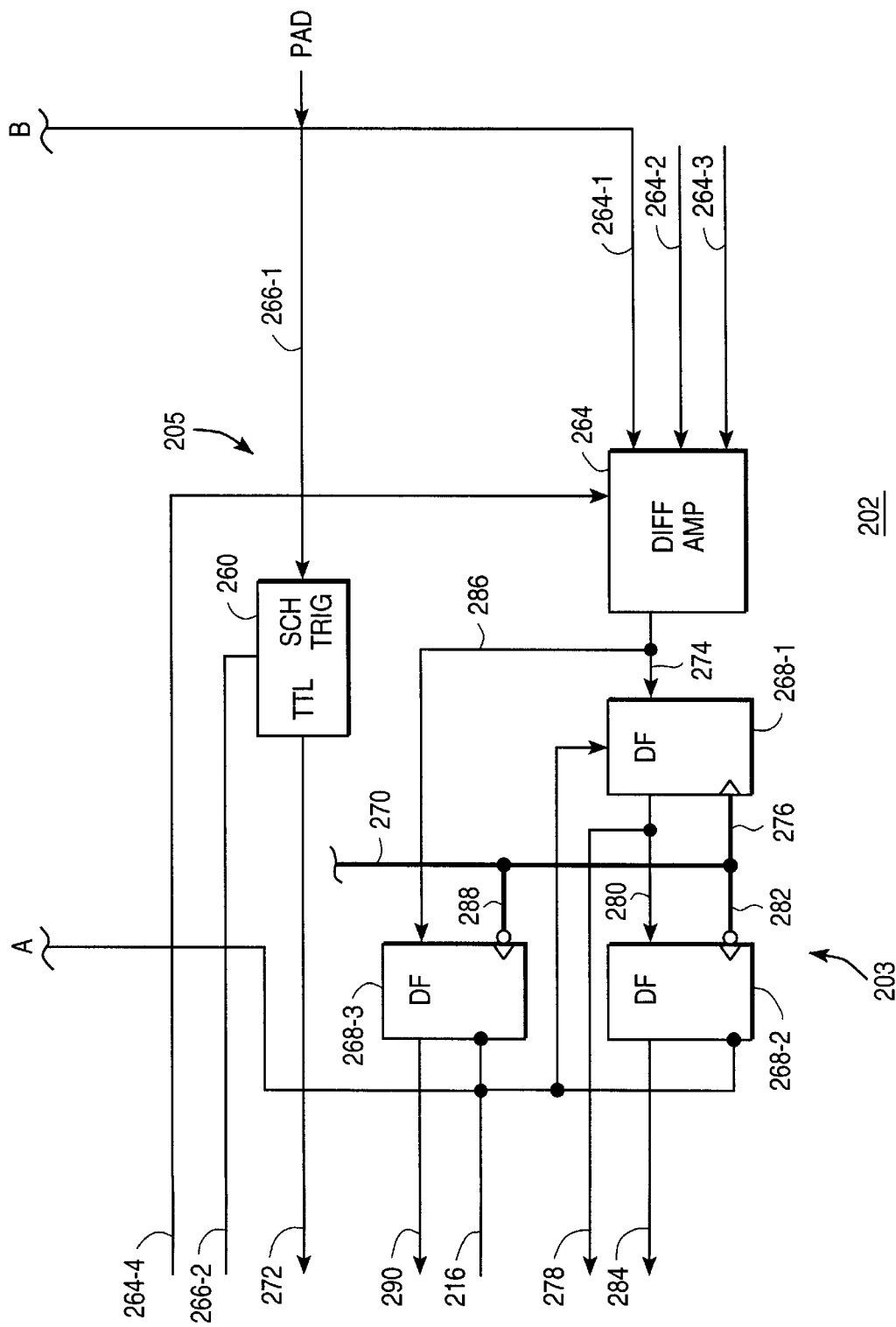

Referring to FIGS. 2A and 2B, there is shown a functional block diagram of one embodiment of the data buffer 130 in accordance with the present invention. The data buffer 130 includes an output circuit 200 (FIG. 2A) and an input circuit 202 (FIG. 2B). The output circuit 200 and the input circuit 202 are each coupled to the pad 110-1 and the core 120 and provide the circuitry that buffers and conditions signals communicated across the I/O interface 100. The output circuit 200 is coupled to the input circuit 202 at letter designations A and B.

The output circuit 200 includes a data capture circuit 204 and a signal conditioning circuit 206. The data capture circuit 204 includes output clock tree 208 (hereinafter also referred to as "CCK_1X"), output clock tree 210 (hereinafter also referred to as "DCK_2X"), latches 212-1 through 212-3, and buffer gates 214-1 through 214-5. The latches 212-1 through 212-3 are, for example, edge-triggered "D" flip-flops. Each of the latches 212-1 through 212-3 are reset by a reset line 216 provided by the core 120.

The latch 212-1 has an input 218 and an input 220. The input 218 is coupled to receive "even" data (SSTL) or "2X" data (AGP) from the core 120. The input 220 is coupled to the output clock tree 208 for receiving a clock/strobe. The output clock tree 208 provides either a data clock/strobe (SSTL) or a "2X" 66 MHz clock/strobe (AGP). The latch 212-1 is further coupled to the buffer gates 214-1 and 214-2 by lines 222-1 and 222-2, respectively. The buffer gates 214-1 and 214-2 are coupled to the signal conditioning circuit 206 by a line 224 for further processing as described in detail below.

The latch 212-2 has an input 226 and an input 228. The input 226 is coupled to receive "odd" data (SSTL) from the core 120. The input 228 is coupled to receive an inverted clock/strobe from the output clock tree 208. The latch 212-2 is further coupled to the buffer gate 214-3 by a line 230. The buffer gate 214-3 is coupled to the signal conditioning circuit 206 by the line 224 for further processing as described in detail below.

The latch 212-3 has inputs 232-1 and 234. The input 232-1 is coupled to receive "1X" data (AGP) from the core 120. The input 234 is coupled to the output clock tree 210 for receiving a clock/strobe. The clock tree 210 provides a memory clock/strobe (SSTL) or a "1X" 66 MHz clock/strobe (AGP). The latch 212-3 is further coupled to the buffer gate 214-4 by a line 236. Additionally, an input 232-2 is coupled directly to the buffer gate 214-5, thereby bypassing the latch 212-3.

The latches 212-1 through 212-3 capture and hold data from the core 120 until released at the next clock/strobe. The buffer gates 214-1 and 214-5 provide additional current drive to the signal conditioning circuit 206 to prevent overloading of the data capture circuit 204. The output clock trees 208 and 210 distribute double rate clock/strobes and single rate clock/strobes, respectively. The double rate clock/strobe operates at twice the frequency of the single rate clock/strobe (FIG. 1B). Both the double rate clock/strobe and the single rate clock/strobe are derived from, for example, a phase locked loop (PLL) in the core 120.

The signal conditioning circuit 206 includes a pre-driver 240, a voltage tolerant circuit 242, a driver circuit 244, a switching well 246, and a pull-up/pull-down circuit 248. The pre-driver 240 is coupled to the buffer gates 214-1 through 214-5 via the line 224. The pre-driver 240 has inputs 250-1, 250-2, and 250-3. The input 250-3 is coupled to receive an output enable signal for enabling the pre-driver 240. The line 250-1 provides a voltage select signal ("VSEL") and the line 250-2 provides a drive select signal ("DRIVESELECT") for providing, respectively, voltage selection and power configuration at the pad 110-1 in accordance with TABLE I below.

TABLE I

| VSEL | VDD | VDDD | VDIO | DRIVESELECT |
|------|-----|------|------|-------------|
| Low  | 2.5 V | 3.3 V | 3.3 V | High/Low |
| High | 2.5 V | 3.3 V | 2.5 V | High/Low |
| Low  | 2.5 V | 2.5 V | 2.5 V | High/Low |

Referring to Table I, there is shown voltage select and power configurations for the pad 110-1. The signals VSEL and DRIVESELECT can be gated together using conventional CMOS logic (e.g., NAND, NOR gates) to select a voltage/power configuration on the pad 110-1. The drive on the pad 110-1 is adjusted, for example, by turning on/off a predetermined number of CMOS gates/buffers (not shown) coupled in parallel. The power supplies $V_{DIO}$, $V_{DDD}$, and $V_{DD}$ are described in further detail below in conjunction with FIG. 6. It is noted that $V_{DIO}$ cannot be higher than $V_{DDD}$.

The voltage tolerant circuit 242 is coupled to the pre-driver 240 by the line 252 for receiving data from the data capture circuit 204. The voltage tolerant circuit 242 is also coupled to the switching well 246 by a line 254 and to a leak enable signal by a line 256.

The present invention works with a number of operating voltages (e.g., 3.3V, 3.3V/2.5V, 5V). The voltage tolerant circuit 242 provides the data buffer 130 with 5 volt tolerance when using 3 volt process technology. For example, in mixed voltage environments the data buffer 130 may drive an output to 3 volts (high) and 0 volts (low). An external source driving the data buffer 130 may, however, drive an output to 3 volts (high) or to 5 volts (high). While the operation of the data buffer 130 is unaffected when the external source switches between 0 volts and 3 volts, if the external source goes to 5 volts, potential problems of shorting with an internal 3 volt supply or failure of internal devices can occur. The voltage tolerant circuit 242 is designed to overcome these problems. The voltage tolerant circuit 242 is the subject matter of U.S. patent application Ser. No. 08/801,002, filed on Feb. 19, 1997, entitled "Voltage Tolerant Input/Output Buffer," incorporated herein by reference.

The driver circuit 244 is coupled to the voltage tolerant circuit 242 by a line 258. The driver circuit 244 has an input 260 for receiving the combined VSEL/DRIVESELECT signals from the core 120 for adjusting the voltage on the pad 110-1. The driver circuit 244 has an input 262 for receiving a control voltage $V_{DIO}$.

The switching well 246 is coupled to the voltage tolerant circuit 242 by the line 254 and includes, for example, pMOS logic for switching between the voltage on the pad 110-1 and a supply voltage (e.g., $V_{DDD}$). An output of the switching well 246 is also coupled to the pad 110-1 and the pull-up/pull-down circuit 248 via a line 249. The switching well 246 works in conjunction with the voltage tolerant circuit 242 and the driver circuit 262 for comparing the voltage on the pad 110-1 with a supply voltage and switching the higher of these two voltages to the switching well 246. The pull-up/pull-down circuit 248 is coupled to lines 248-1 and 248-2 for receiving a pull-up signal and a pull-down signal, respectively.

The pull-up/pull-down circuit 248 includes a pull-up resistor and a pull-down resistor (not shown). The pull-up resistor is used to pull-up the voltage on the pad 110-1. The pull-down resistor is used pull-down the voltage on the pad 110-1. The pull-up signal enables/disables the pull-up resistor. The pull-down signal enables/disables the pull-down transistor. It is noted that these signals should be used in conjunction with the output enable signal on line 256 and should not be enabled at the same time.

It is noted that additional signals may be provided to the data buffer 130. For example, an AGP select signal can be provided to the data buffer 130 for switching between AGP and DDR/SSTL. Also, a bypass signal can be provided to the data buffer 130 to bypass the latches 212-1 through 212-3 in the data capture circuit 204. The bypass signal can be used, for example, to provide backward compatibility with older protocols. The AGP signal and the bypass signal can be implemented with, for example, a combination of CMOS logic gates (e.g., NAND, NOR).

The output circuit 200 described above provides a flexible and reliable I/O interface for buffering signals communicated between the core 120 and the pad 110-1 while maintaining on-the-fly compliance with an operative protocol. Specifically, the output circuit 200 enables the delivery of signals to external high frequency busses in TTL format (PCI), edge-centered format (AGP, DDR), or window-strobe mode with precise timing control. It is noted that the output clock trees 208 and 210 are designed using custom physical layouts that provide tight control of clock parameters (e.g., skew, duty cycle, rise/fall times).

Referring now to FIG. 2B, there is shown the input circuit 202 in accordance with the present invention. The input circuit 202 includes a data capture circuit 203 and a signal conditioning circuit 205.

The signal conditioning circuit 205 includes a differential amplifier 264 and a Schmitt trigger 266. The differential amplifier 264 has inputs 264-1 through 264-4. The input 264-1 is for receiving differential input signals (e.g., DDR/SSTL) from the pad 110-1. The input 264-2 is coupled to a reference voltage (hereinafter also referred to as "$V_{REF}$") generated off-chip. The input 264-3 is coupled to a bias voltage (hereinafter also referred to as "VBIAS") generated on-chip. The bias voltage is set, for example, by a current mirror which generates a current source in the differential amplifier 264. The input 264-4 is coupled to a power down signal for powering down the differential amplifier 264.

The differential amplifier 264 compares the voltage signal on the pad 110-1 with the reference voltage and generates a logic 1 if the voltage is greater than the reference voltage and generates a logic 0 if the voltage is less than the reference voltage. The peak-to-peak voltage swing for a DDR/SSTL formatted signal is typically about 0.8 volts and the reference voltage is typically about 1.5 volts.

The Schmitt trigger 266 has inputs 266-1 and 266-2. The input 266-1 is for receiving TTL formatted signals from the pad 110-1. The input 266-2 is coupled to a power down signal for powering down the Schmitt trigger 266. The Schmitt trigger 266 provides TTL formatted signals to the core 120 via a line 272. The line 272 can be set to a logic 0 when not receiving TTL formatted signals.

The Schmitt trigger 266 is a conventional circuit that provides, for example, fast level transitions by using hysteresis to derive a clean edge from a jittery or slowly varying waveform at the pad 110-1.

The data capture circuit 203 includes latches 268-1 through 268-3 and an input clock tree 270 (hereinafter also referred to as "ICK"). It is noted that the input clock tree 270 provides a buffered clock/strobe that is generated off-chip by an external source. The latch 268-1 is coupled to an output of the differential amplifier 264 by a line 274 for receiving signals from the differential amplifier 264. An input 276 of the latch 268-1 is coupled to the input clock tree 270 for receiving a clock/strobe. Additionally, a line 278 is coupled to an output of the latch 268-1 for providing data at the negative edge of the clock/strobe.

An input of the latch 268-2 is coupled to the output of the latch 268-1 by a line 280. An input 282 of the latch 268-2 is coupled to the clock tree 270 for receiving an inverted clock/strobe. A line 284 is coupled to an output of the latch 268-2 for providing data at the next positive edge of the clock/strobe.

The latch 268-3 is coupled to receive data from the differential amplifier 264 via a line 286. An input 288 of the latch 268-3 is coupled to the clock tree 270 for receiving the inverted clock/strobe. A line 290 coupled to an output of the latch 268-3 provides data at the next positive edge of the inverted clock/strobe.

The input circuit 202 described above provides a flexible and reliable I/O interface for buffering signals communicated between the core 120 and the pad 110-1 while maintaining on-the-fly compliance with an operative protocol. Specifically, the input circuit 202 enables the reliable capture of data received either in window-strobe mode (DDR) or edge strobe mode (AGP). Alternatively, the input circuit 202 captures data from busses running PCI protocol. It is noted that the input clock tree 270 is designed using a custom physical layout that provides tight control of clock parameters (e.g., skew, duty cycle, rise/fall times).

Figure 3:
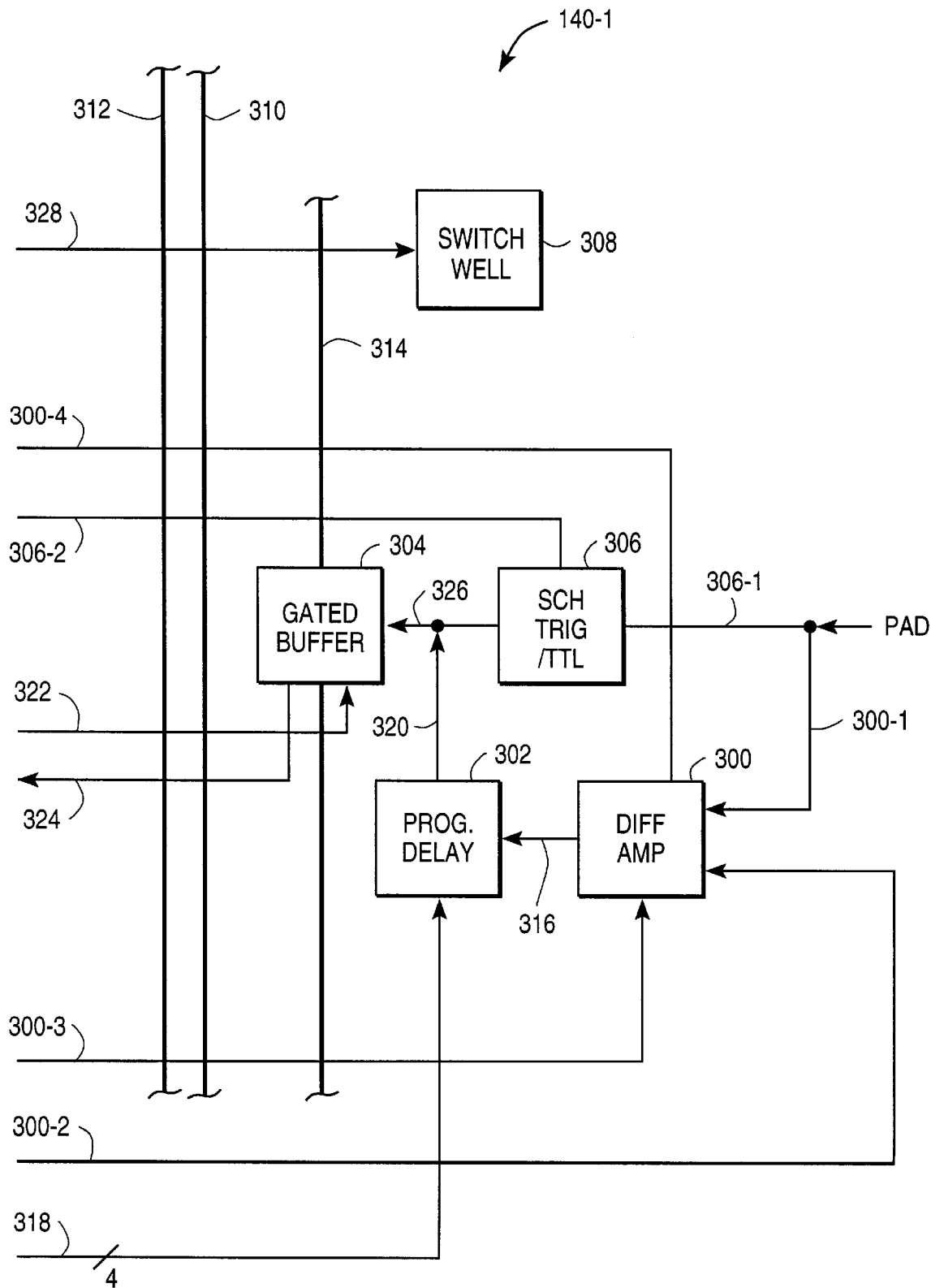
FIG. 3 is a functional block diagram of one embodiment of the clock/strobe buffer in FIG. 1A including a programmable delay module in accordance with the present invention.

Referring to FIG. 3, there is shown a functional block diagram of one embodiment of the clock/strobe buffer 140-1 in accordance with the present invention. The clock/strobe buffer 140-1 includes a differential amplifier 300, a programmable delay module 302, a gated buffer 304, a Schmitt trigger 306, and a switch well 308. The clock/strobe buffer 140-1 also includes an output clock tree 310, an output clock tree 312, and an input clock tree 314.

The clock/strobe buffer 140-1 is an input buffer that includes programmable circuitry for conditioning (e.g., delaying) external clock/strobes from the pad 110-2 for use by the data buffer 130. This circuitry is preferably implemented using 0.25u CMOS technology as described in further detail below.

The differential amplifier 300 has inputs 300-1 through 300-4. The input 300-1 is for receiving differential clock/strobe signals (e.g., DDR/SSTL) from the pad 110-2. The input 300-2 is coupled to a reference voltage generated off-chip. The input 300-3 is coupled to a bias voltage generated on-chip. The bias voltage is set, for example, by a current mirror by generating a current source in the differential amplifier 300. The input 300-4 is coupled to a power down signal for powering down the differential amplifier 300.

The differential amplifier 300 compares the voltage of a signal on the pad 110-2 with the reference voltage and generates a logic 1 if the voltage is greater than the reference voltage and generates a logic 0 if the voltage swing is less than the reference voltage. The peak-to-peak voltage swing is typically about 0.8 volts and the reference voltage is typically about 1.5 volts.

The programmable delay module 302 is coupled to the differential amplifier 300 by a line 316 for receiving a clock/strobe. An input 318 of the programmable delay module 302 is coupled to receive a plurality of program bits which are used to program the delay to be added to the clock/strobe. These bits are indicative of a range of programmable delay values where, for example, 0000 provides the least delay and 1111 provides the most delay. The amount of delay to be added is determined by protocol. The delay is added to eliminate skew between received data and the clock/strobe to guarantee reliable data capture.

The gated buffer 304 is coupled to the programmable delay module 302 by a line 320. The gated buffer 304 is also coupled to the input clock tree 314 which provides a buffered version of the clock on pad 110-2. For example, the clock/strobe at the pad 110-2 is gated into a 32-bit buffered clock/strobe comprising two 16-bit groups which are distributed to the data buffer 130. The gated buffer 304 is further coupled to a line 322 for receiving a clock/strobe valid signal from the core 120 and a line 324 for directly feeding the clock/strobe on the pad 110-2 to the core 120.

The Schmitt trigger 306 has inputs 306-1 and 306-2 and is coupled to the gated buffer 304 by a line 326. The input 306-1 is for receiving a TTL formatted clock/strobe from the pad 110-2. The input 306-2 of the Schmitt trigger 306 is coupled to a power down signal for powering down the Schmitt trigger 306.

The Schmitt trigger 306 is a conventional circuit that provides, for example, fast level transitions by using hysteresis to derive a clean clock from a jittery or slowly varying waveform at the pad 110-2.

The switch well 308 has an input 328 for receiving a leak enable signal for enabling a weak leak path while operating in a 5V tolerant mode as described previously in conjunction with the signal conditioning circuit 206 (FIG. 2A). The switch well 308 includes circuitry for providing a mechanism to keep the n-well at a potential which is the higher of either the pad 110-2 or a supply voltage.

Figure 4A:
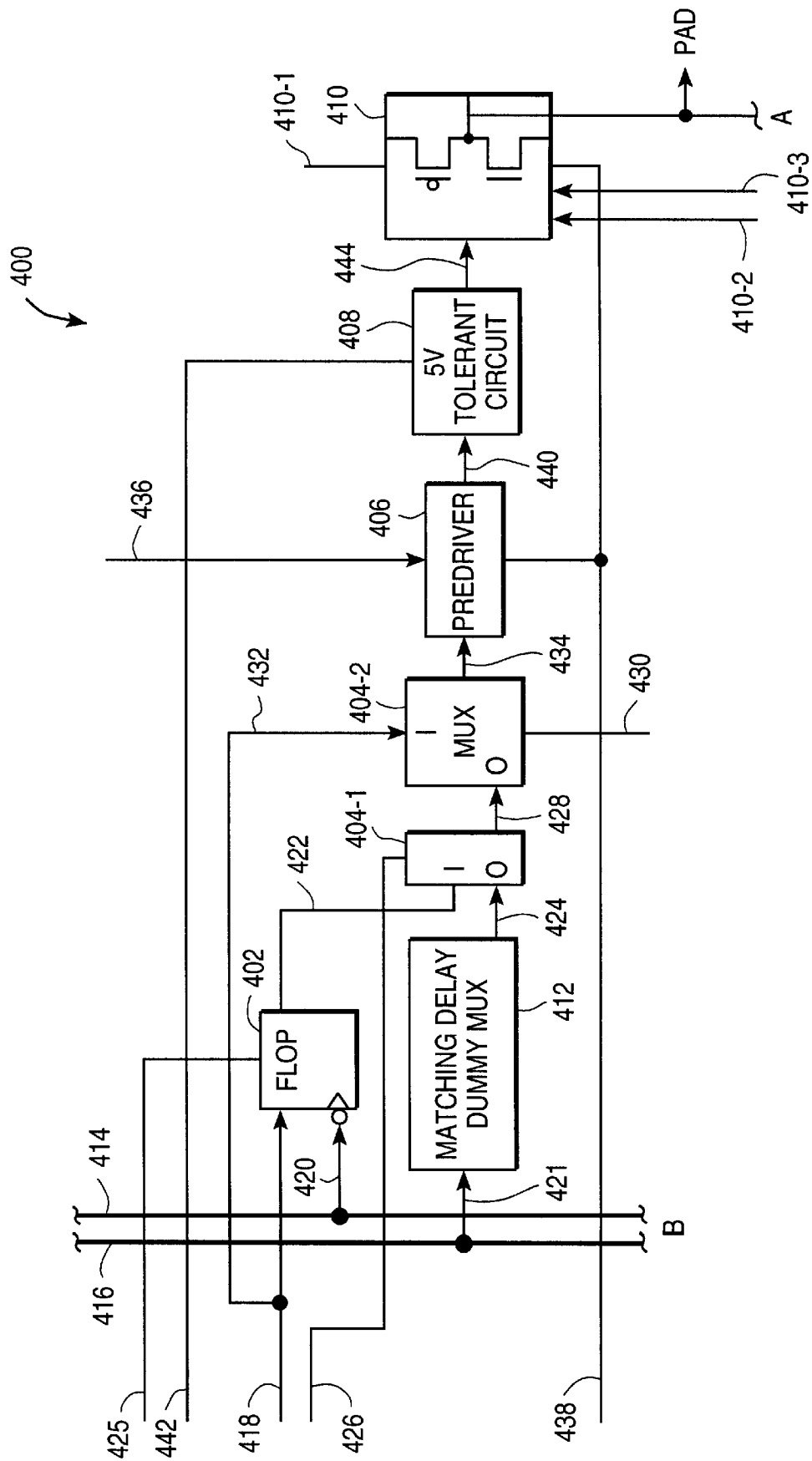
FIGS. 4A and 4B are functional block diagrams of one embodiment of the clock/strobe buffer in FIG. 1A including a matching delay dummy multiplexer in accordance with the present invention.
Figure 4B:
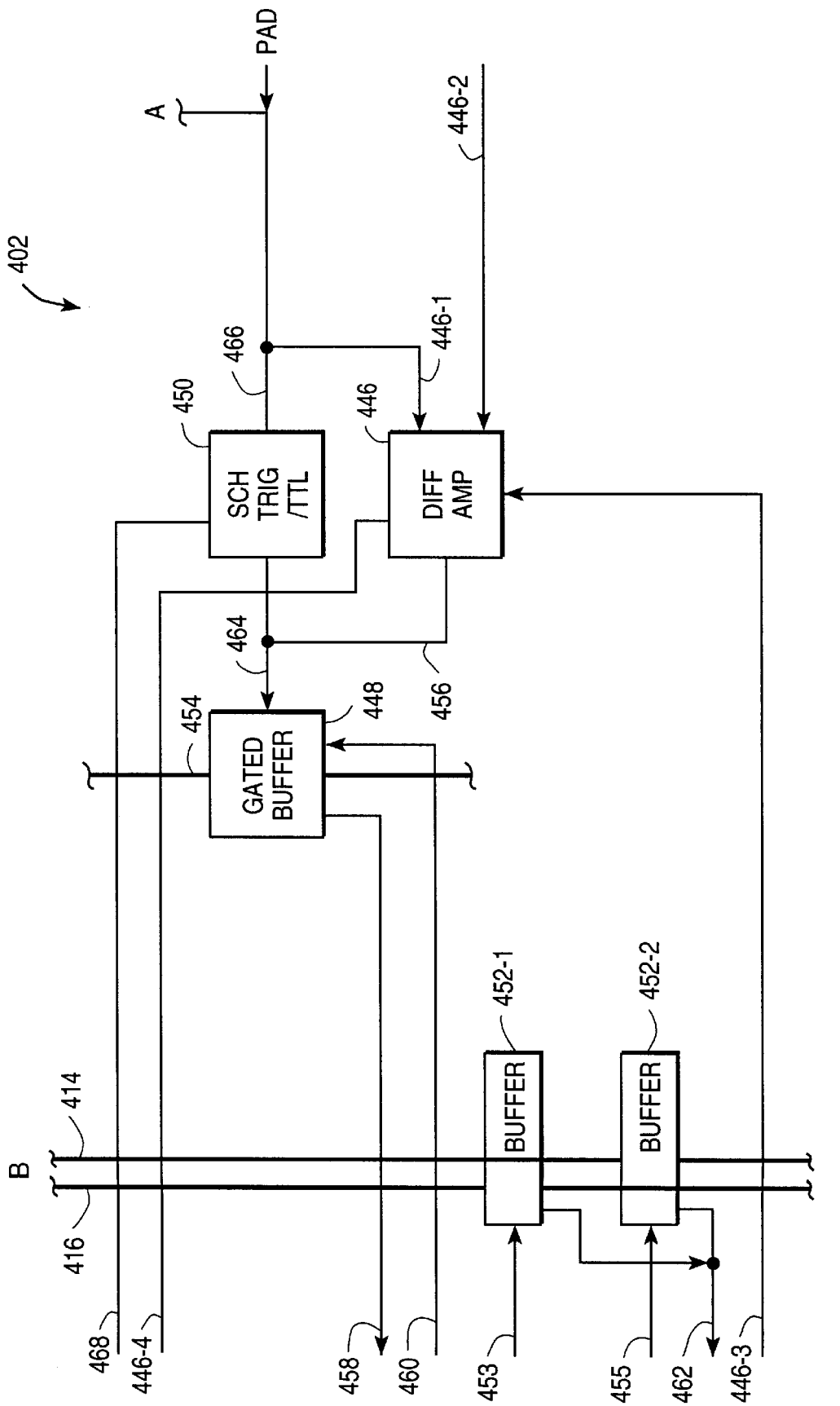

Referring to FIGS. 4A and 4B, there is shown a functional block diagram of one embodiment of the clock/strobe buffer in FIG. 1A including a matching delay dummy multiplexer in accordance with the present invention. The clock/strobe buffer 140-2 includes an output circuit 400 (FIG. 4A) and an input circuit 402 (FIG. 4B). The output circuit 400 and the input circuit 402 are each coupled to the pad 110-2 and the core 120 for buffering and distributing clock/strobes. The output circuit 400 is coupled to the input circuit 402 at letter designations A and B.

The output circuit 400 includes a latch 402, multiplexers 404-1 and 404-2, a pre-driver 406, a voltage tolerant circuit 408, a driver circuit 410, a matching delay dummy multiplexer 412, and output clock trees 414 and 416.

The latch 402 has an input 418 coupled to the core 120 for receiving either a ground supply (hereinafter also referred to as "$V_{SS}$"), an output signal (TTL), or a data/clock output clock ("1X" SSTL). The latch 402 has an input 420 coupled to the output clock tree 414 for receiving an inverted delayed clock. The delayed clock is derived from, for example, a PLL in the core 120. The delayed clock is described in further detail below.

The multiplexer 404-1 is coupled to the latch 402 by a line 422 and coupled to the matching delay dummy multiplexer by a line 424. The latch 402 holds a signal on line 422 until the next clock/strobe. The multiplexer 404-1 also has an input 426 for receiving a select AGP signal. For example, if the select AGP signal is a logic 1, then AGP is enabled. Similarly, if the select AGP signal is a logic 0, then SSTL is enabled. A line 425 is coupled to the latch 402 and is used to reset the latch 402.

The multiplexer 404-2 is coupled to the multiplexer 404-1 by a line 428. The multiplexer 404-2 also has an input 430 and an input 432. The input 430 is for receiving a bypass signal to enable a bypass mode. The input 432 is coupled to line 418 for receiving the clock/strobe output from the core 120.

The pre-driver 406 is coupled to the multiplexer 404-2 by a line 434. The pre-driver 406 has an input 436 and an input 438. The input 436 is for receiving an output enable signal for enabling the output of the voltage tolerant circuit 408. The input 438 is for receiving a voltage selection signal for controlling the output voltage on the pad 110-2.

The voltage tolerant circuit 408 is coupled to the pre-driver by a line 440. The voltage tolerant circuit has an input 442 for receiving a leak enable signal for enabling the weak leak path when operating in a 5V tolerance mode. The voltage tolerant circuit 408 is described in further detail in U.S. patent application Ser. No. 08/801,002, filed on Feb. 19, 1997, entitled "Voltage Tolerant input/output Buffer," incorporated herein by reference.

The driver circuit 410 is coupled to the voltage tolerant circuit 408 by a line 444. The driver circuit 410 has inputs 410-1 through 410-3. The input 410-1 is for receiving the control voltage VDIO. The input 410-2 is for receiving a pull-up enable signal for raising the voltage on the pad 110-2 using a pull-up resistor (not shown). Similarly, the input 410-3 is for receiving a pull-down enable signal for lowering the voltage on the pad 110-2 using a pull-down resistor (not shown).

The matching delay dummy multiplexer 412 is coupled to the output clock tree 416 by a line 421 and to the multiplexer 404-1 by the line 424. The dummy delay multiplexer 412 receives on the line 421 a single rate clock/strobe. The clock/strobe is processed by the dummy delay multiplexer 412 as described below in conjunction with FIG. 5

The output circuit 400 described above provides a flexible and reliable I/O interface for buffering clock/strobes communicated between the core 120 and the pad 110-2 while maintaining on-the-fly compliance with an operative protocol.

Referring to FIG. 4B, the input circuit 402 includes a differential amplifier 446, a gated buffer 448, a Schmitt trigger 450, buffers 452-1 through 452-2, and an input clock tree 454. The input circuit 402 also includes the output clocks trees 414 and 416 previously described in conjunction with FIG. 4A.

The differential amplifier 446 has inputs 446-1 through 446-4. The input 446-1 is coupled to the pad 110-2 for receiving differential clock/strobe signals from the pad 110-2. The input 446-2 is for receiving a reference voltage which is generated on-chip. The input 446-3 is for receiving a bias voltage which is generated off-chip. The input 446-4 is for receiving a power down signal for powering down the differential amplifier 446.

The gated buffer 448 is coupled to the differential amplifier 446 by a line 456 and provides a buffered version of the clock/strobe on the pad 110-2. The gated buffer 448 is also coupled to a line 458 which provides a feed through clock/strobe to the core 120. The gated buffer also has an input 460 for receiving a clock/strobe valid signal.

The buffers 452-1 and 452-2 are coupled to a data/clock output clock 453 and a delayed data/clock output clock 455, respectively, and provide drive to both ends of these clocks. The buffer 452-1 also has an output 462 for providing a feedback clock to, for example, a PLL disposed in the core 120. The data/clock output clock 453 receives either a "1X" data output clock (AGP), a clock output clock ("2X" SSTL), or a ground bus $V_{SS}$ ("1X" SSTL or TTL). The delayed data/clock output clock 455 receives either a "2X" data clock (AGP), a data output clock (SSTL), or a ground bus $V_{SS}$ (TTL).

The Schmitt trigger 450 has an input 466 for receiving a TTL formatted clock/strobe from the pad 110-2. The Schmitt trigger 450 is coupled to the gated buffer 448 by a line 464. The Schmitt trigger 450 also has an input 468 for receiving a power down signal for powering down the Schmitt trigger 450.

The Schmitt trigger 450 is a conventional circuit that provides, for example, fast level transitions by using hysteresis to derive a clean clock/strobe from a jittery or slowly varying clock/strobe at the pad 110-2.

The input circuit 402 described above provides a flexible and reliable I/O interface for buffering and distributing clock/strobes while maintaining on-the-fly compliance with an operative protocol. It is noted that the clock trees 414, 416, and 454 are designed using custom physical layouts that provide tight control of clock parameters (e.g., skew, duty cycle, rise/fall times).

Figure 5:
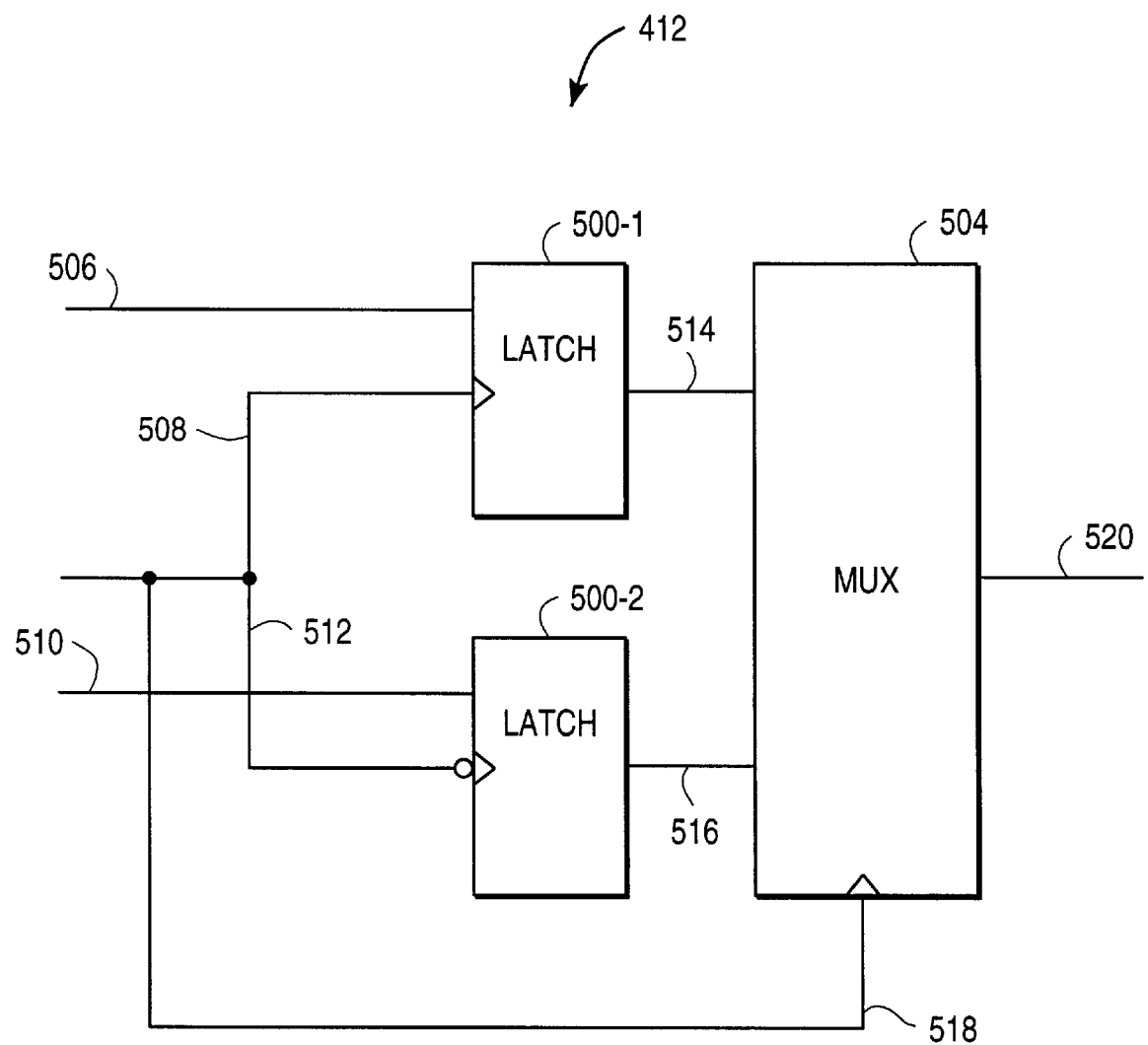
FIG. 5 is a functional block diagram of one embodiment of the matching delay dummy multiplexer in FIG. 4A in accordance with the present invention.

Referring to FIG. 5, there is shown a functional block diagram of one embodiment of the matching delay dummy multiplexer 412 in FIG. 4A in accordance with the present invention. The matching delay dummy multiplexer 412 includes latches 500-1, 500-2, and a multiplexer 504.

The latch 500-1 has inputs 506 and 508. The input 506 is for receiving data derived from the core 120. The input 508 is coupled to the clock 416 shown in FIGS. 4A and 4B for receiving a single rate clock/strobe.

The latch 500-2 has inputs 510 and 512. The input 510 is for receiving data derived from the core 120. The input 512 is coupled to the clock tree 416 shown in FIG. 4A and 4B for receiving an inverted single rate clock/strobe.

The multiplexer 504 is coupled to the latches 500-1 and 500-2 by lines 514 and 516, respectively, for receiving latched clocks/strobes. The multiplexer 504 is also coupled to the single rate clock/strobe by a line 518. The single rate clock/strobe is used to trigger latches 500-1, 500-2, and the multiplexer 504. The multiplexer 504 provides a delayed signal on line 520.

The matching delay multiplexer 412 essentially mimics delay to minimize skew between the strobe derived from the PLL and data at output 520 as shown in FIG. 5.

Figure 6A:
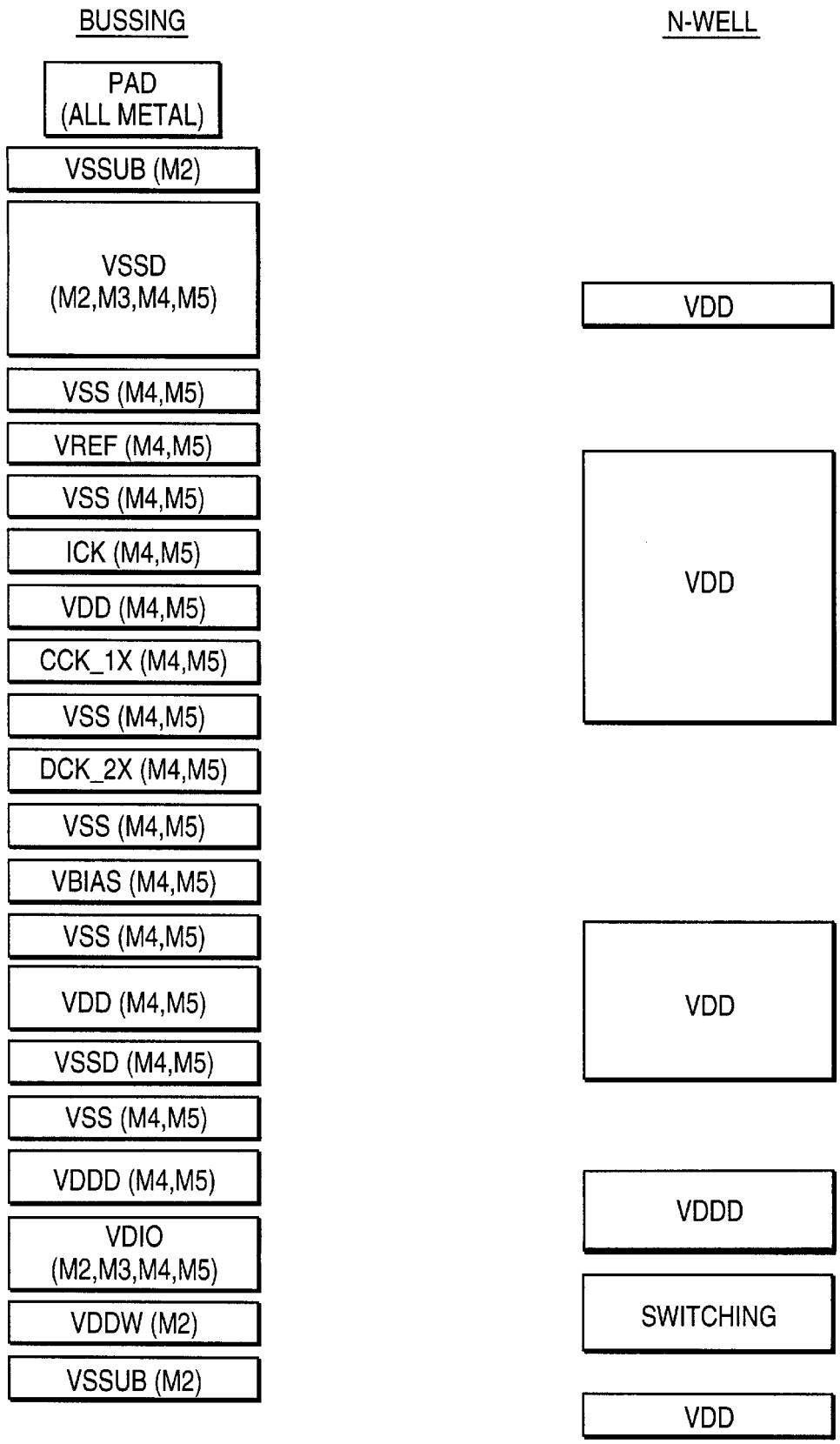
FIG. 6A is a layout representation illustrating one embodiment of a bussing/n-well scheme in accordance with the present invention.

Referring to FIG. 6A, there is shown a layout representation illustrating one embodiment of a bussing/n-well scheme in accordance with the present invention. The scheme includes six power busses and three ground busses disposed on at least one of a plurality of metal layers (hereinafter also referred to as $M_2$ through $M_5$), six n-wells, and three clock busses CCK_1X, DCK_2X, and ICK. The clock busses CCK_1X, DCK_2X, and ICK correspond to the clock trees 210, 208, and 270, respectively, shown in FIGS. 2A and 2B. The n-wells preferably are created in a p-type substrate (wafer) using conventional n-well CMOS process technology (e.g., diffusion). For clarity, diffusion regions and circuitry are not shown in FIGS. 6A and 6B. It is noted that guard rings may be coupled to, for example, the $V_{DDD}$ or $V_{SSD}$ busses to guard against latch-up from transient signals on the pad 110-1. Moreover, the data buffer circuitry (not shown) is preferably ground on both sides to reduce noise coupling.

The power busses include positive supplies $V_{DD}$, $V_{DDD}$, $V_{DDW}$, $V_{DIO}$, $V_{REF}$, and $V_{BIAS}$. $V_{DD}$ is generated off-chip and provides power to circuitry in the core 120. $V_{DDD}$ is also generated off-chip and provides power to most of the circuitry (e.g., thick p-devices) in the I/O ring. Two exceptions are the driver circuit 244 (FIG. 2A) and the driver circuit 410 (FIG. 4A) which are powered by $V_{DIO}$. $V_{DIO}$ is electrically isolated from the $V_{DDD}$ so that the voltage on the pads 110-1 and 110-2 can be adjusted without disturbing the power supply to the other circuits in the I/O ring. $V_{DDW}$ is a back-up power bus for coupling switch wells (FIG. 2A) in the I/O ring. Under normal operation, these switch wells are not actively coupled to other circuitry in the I/O ring.

The bussing/n-well scheme further includes ground busses $V_{SS}$, $V_{SSUB}$, and $V_{SSD}$. $V_{SS}$ supplies circuitry in the core 120 with a zero voltage reference or ground. $V_{SSUB}$ is coupled to a substrate for providing circuitry with a zero voltage reference. $V_{SSD}$ supplies the circuitry in the I/O ring with a zero voltage reference.

$V_{REF}$ and $V_{BIAS}$ provide a reference voltage and a bias voltage, respectively, to the differential amplifiers 264 (FIG. 2B), 300 (FIG. 3), and 446 (FIG. 4B). $V_{REF}$ is derived off-chip from $V_{DD}$. $V_{BIAS}$ is generated on-chip.

The power busses just described are each coupled to at least one n-well (e.g., $V_{DD}$, $V_{DDD}$) for supplying power to the circuitry (e.g., p-devices) in the data buffer 130 and clock/strobe buffers 140-1 and 140-2. The power busses are coupled to the n-wells through one or more metal layers, $M_2$ through $M_5$, which are made of, for example, aluminum. The metal layers are electrically coupled together using conventional techniques (e.g., vias, polysilicon layers).

For example, the bus $V_{DDD}$ is disposed on metal layers $M_4$ and $M_5$ which are coupled to a $V_{DDD}$ n-well with, for example, metal interconnects. Similarly, the bus $V_{DIO}$ is disposed on metal layers $M_2$ through $M_5$. The clock busses CCK_1X and DCK_2X are each disposed on metal layers $M_4$ and $M_5$.

Figure 6B:
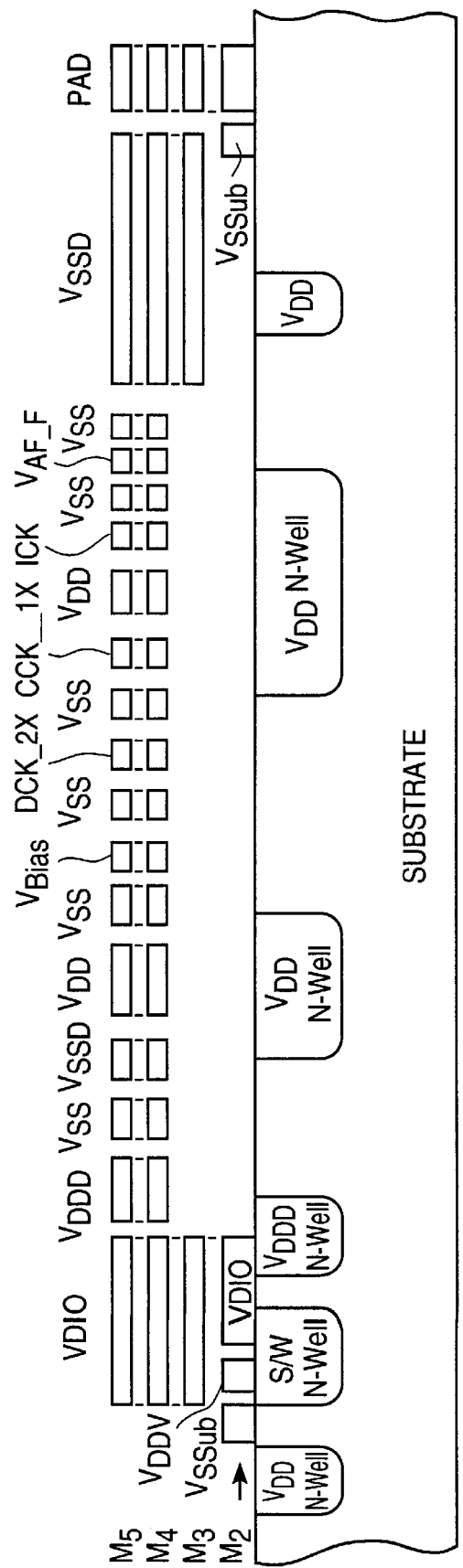
FIG. 6B is a cross-sectional view of the layout representation in FIG. 6A in accordance with the present invention.

Referring to FIG. 6B, there is shown a cross-sectional view of the layout representation in FIG. 6A in accordance with the present invention. The cross-section includes a p-type substrate with n-wells diffused therein. The pads 110-1 and 110-2 are coupled to the metal layers $M_2$–$M_5$ for providing power to the power busses $V_{DD}$ and $V_{DDD}$. The power busses $V_{DD}$ and $V_{DDD}$ are further coupled to the n-wells for providing power to p-devices disposed thereon.

Figure 7:
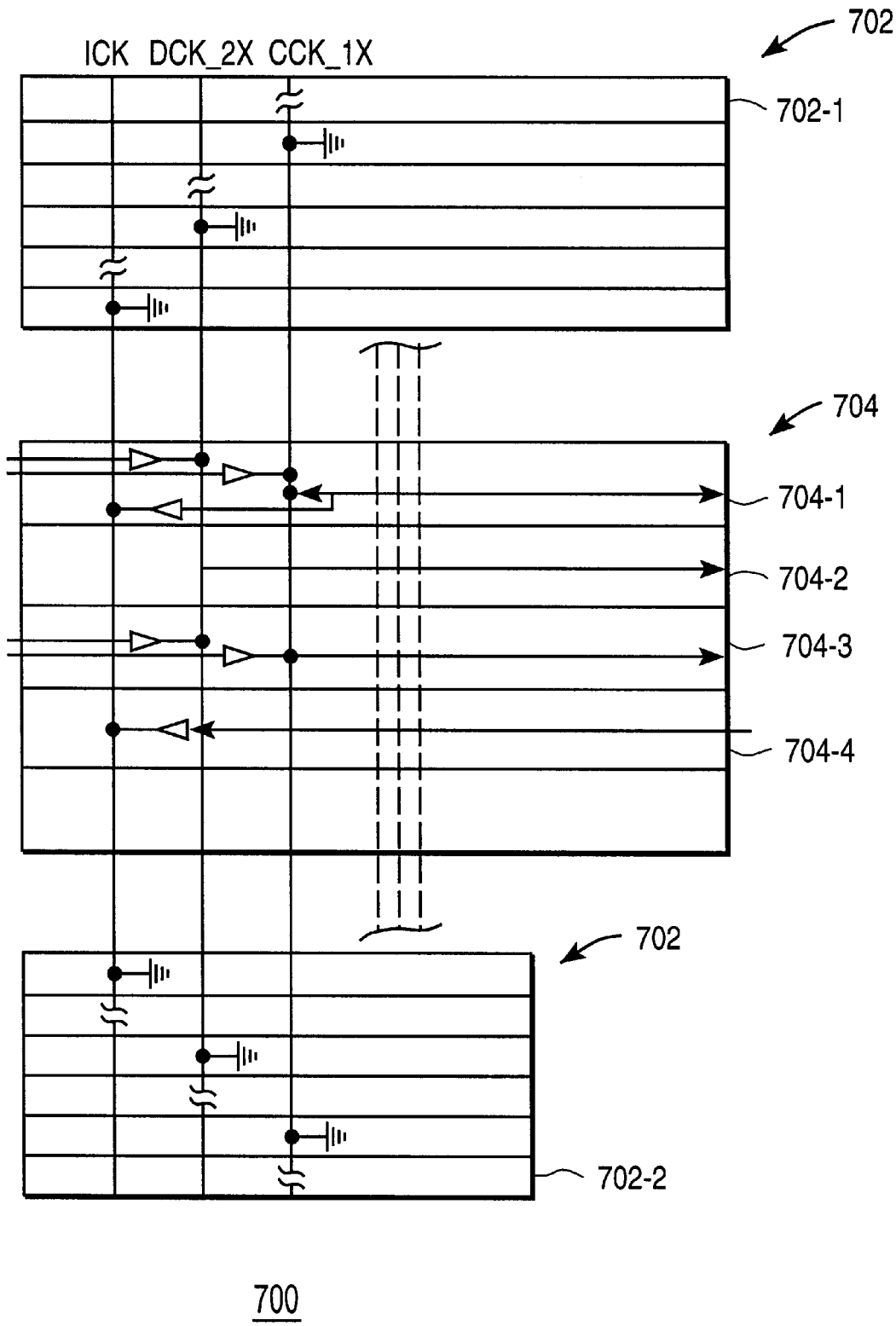
FIG. 7 is a layout representation illustrating several embodiments of an I/O assembly for an integrated circuit chip in accordance with the present invention.

Referring to FIG. 7, there is shown a layout representation illustrating several embodiments of an I/O assembly 700 for an integrated circuit chip in accordance with the present invention. The I/O assembly 700 includes breaker cells 702, data cells 704, and clock trees ICK, DCK_2X, and CCK_1X, as previously described above in conjunction with FIGS. 2–7. The data cells 704 each include an embodiment of the data buffer 130 (not shown), previously described in conjunction with FIGS. 2A and 2B. It is noted that the vertical dashed lines in FIG. 7 indicate that additional data cells 704 may be added to the I/O assembly 700.

The breaker cells 702 are disposed on the top and the bottom of the data cells 704 as shown in FIG. 7. The breaker cells 702 isolate the clock trees CCK_1X, DCK_2X, and ICK, so that different protocols can be executed in synchronous mode. For example, the breaker cell 702-1 and the breaker cell 702-2 isolate the clock tree CCK_1X wire segments from the adjacent CCK_1X wire segments (702-1) and the CCK_1X wire segments connected to $V_{SS}$ (702-2). It is noted that all three clock trees are disconnected from the data cells 704 while operating in asynchronous mode.

In one embodiment of the I/O assembly 700, an data cell 704-1 is coupled to clock trees ICK, DCK_2X, and CCK_1X, for capturing and buffering data signals from the core 120 or pad 110-1 as described in conjunction with FIGS. 2A and 2B. In another embodiment of the I/O assembly 700, a data cell 704-2 is coupled to output clock tree DCK_2X for capturing output data signals from the core 120 at a double clock rate as described in conjunction with FIGS. 2A and 2B. In yet another embodiment of the I/O assembly 700, an data cell 704-3 is coupled to output clock trees CCK_1X and DCK_2X for capturing output data signals from the core 120 at either a single clock rate or a double clock rate as described in conjunction with FIGS. 2A and 2B. In still another embodiment of the I/O assembly 700, an data cell 704-4 is coupled to the input clock tree ICK for capturing input data signals from the pad 110-1 as described in conjunction with FIGS. 2A and 2B.

Figure 8:
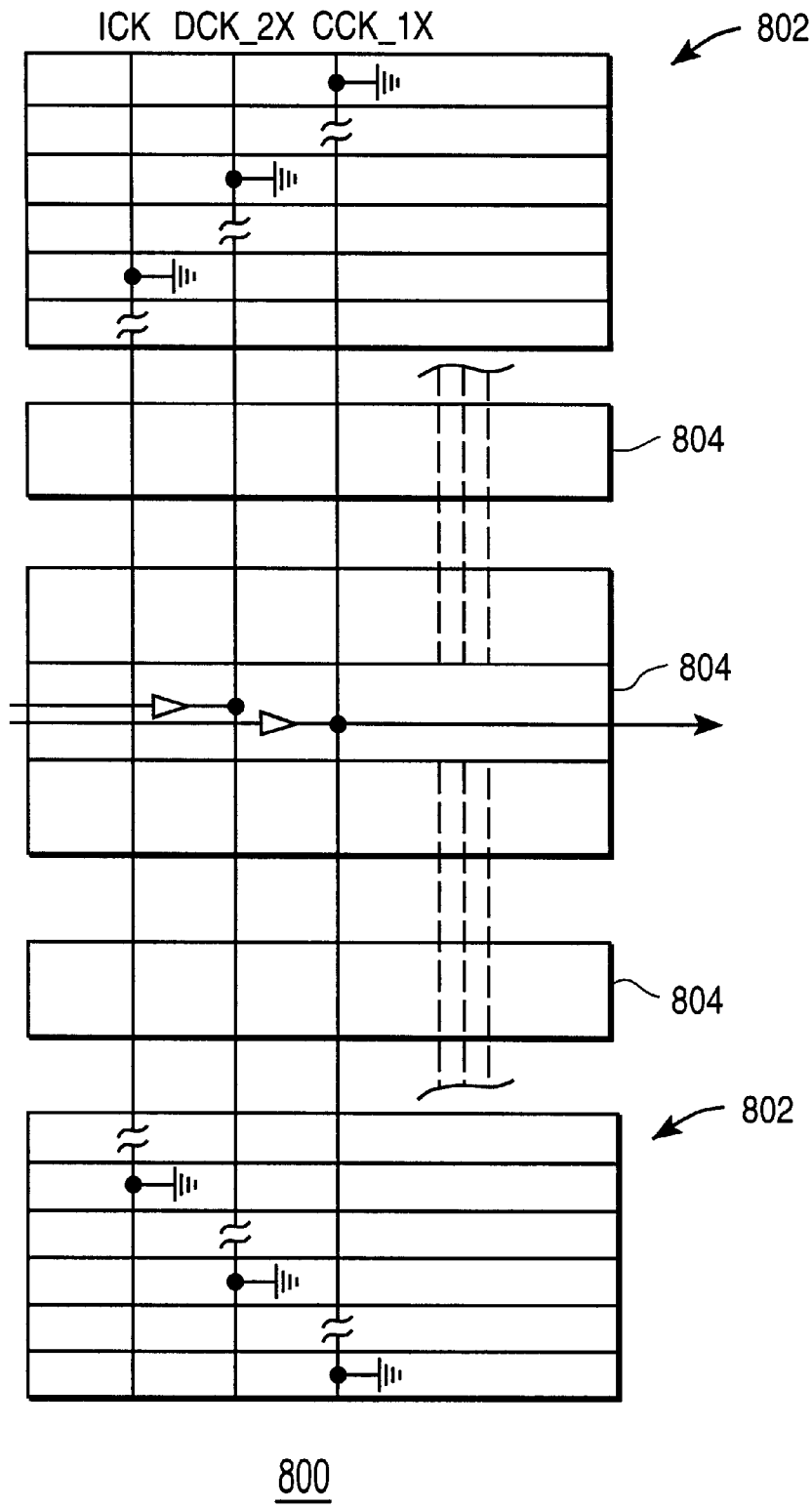
FIG. 8 is a layout representation illustrating one embodiment of an I/O assembly for AGP in accordance with the present invention.

Referring to FIG. 8, there is shown a layout representation illustrating one embodiment of an I/O assembly 800 for AGP in accordance with the present invention. The I/O assembly 800 includes breaker cells 802, data cells 804, and clock trees ICK, DCK_2X, and CCK_1X, as previously described above in conjunction with FIGS. 2–7. The data cells 804 include embodiments of the data buffer 130 (not shown) previously described in conjunction with FIGS. 2A and 2B. As already noted, the vertical dashed lines indicate that additional data cells 804 may be added to the I/O assembly 800.

The breaker cells 802 are for isolating the clock trees CCK_1X, DCK_2X, and ICK, so that different protocols can be executed in synchronous mode. It is noted that all three clock trees are disengaged when operating in asynchronous mode. The data cells are coupled to clock trees ICK, DCK_2X, and CCK_1X, for capturing and buffering data signals from the core 120 or pad 110-1 using AGP protocol, as described in conjunction with FIGS. 2A and 2B.

Figure 9:
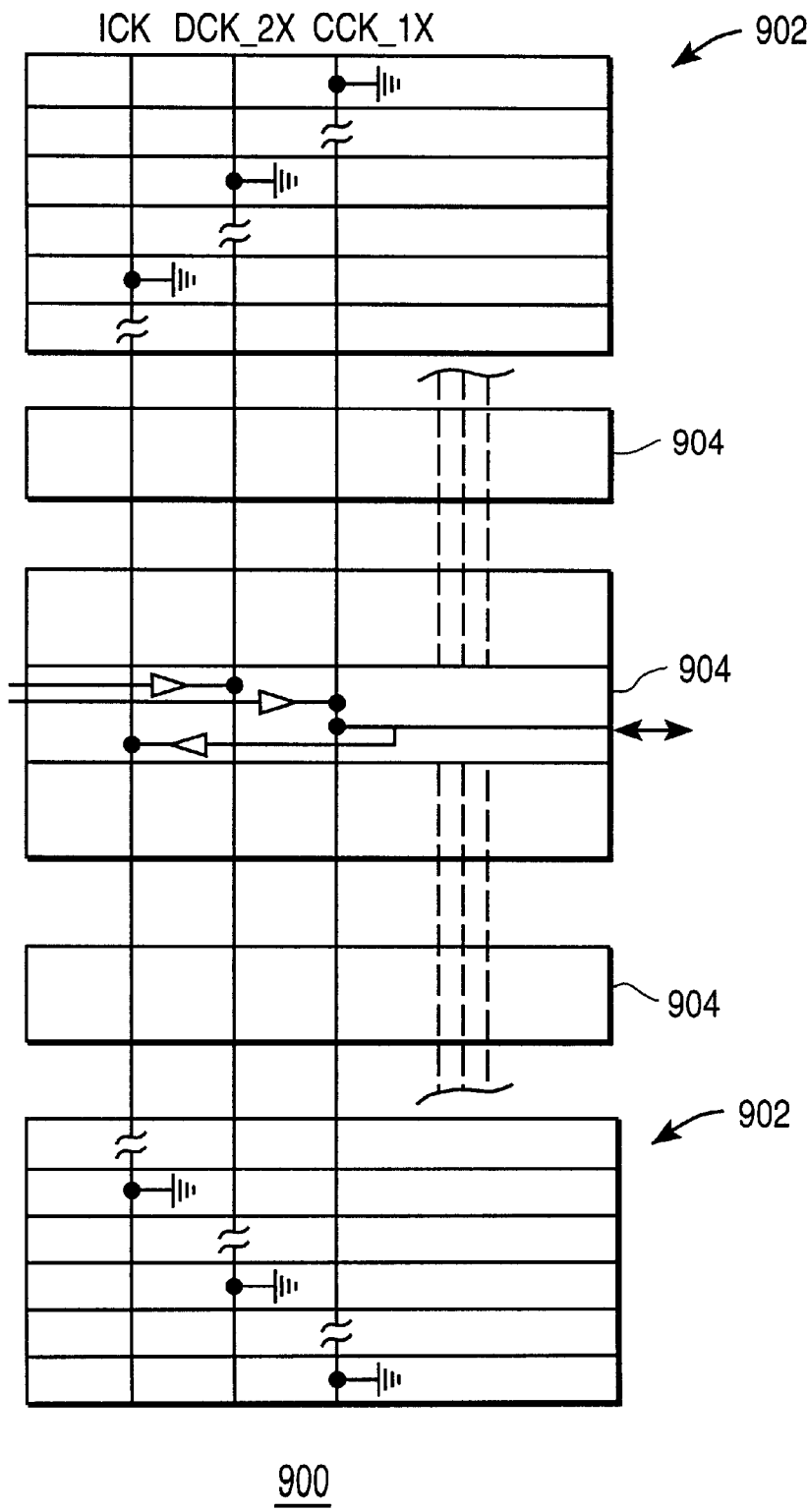
FIG. 9 is a layout representation illustrating one embodiment of an I/O assembly for DDR in accordance with the present invention.
Figure 2A:
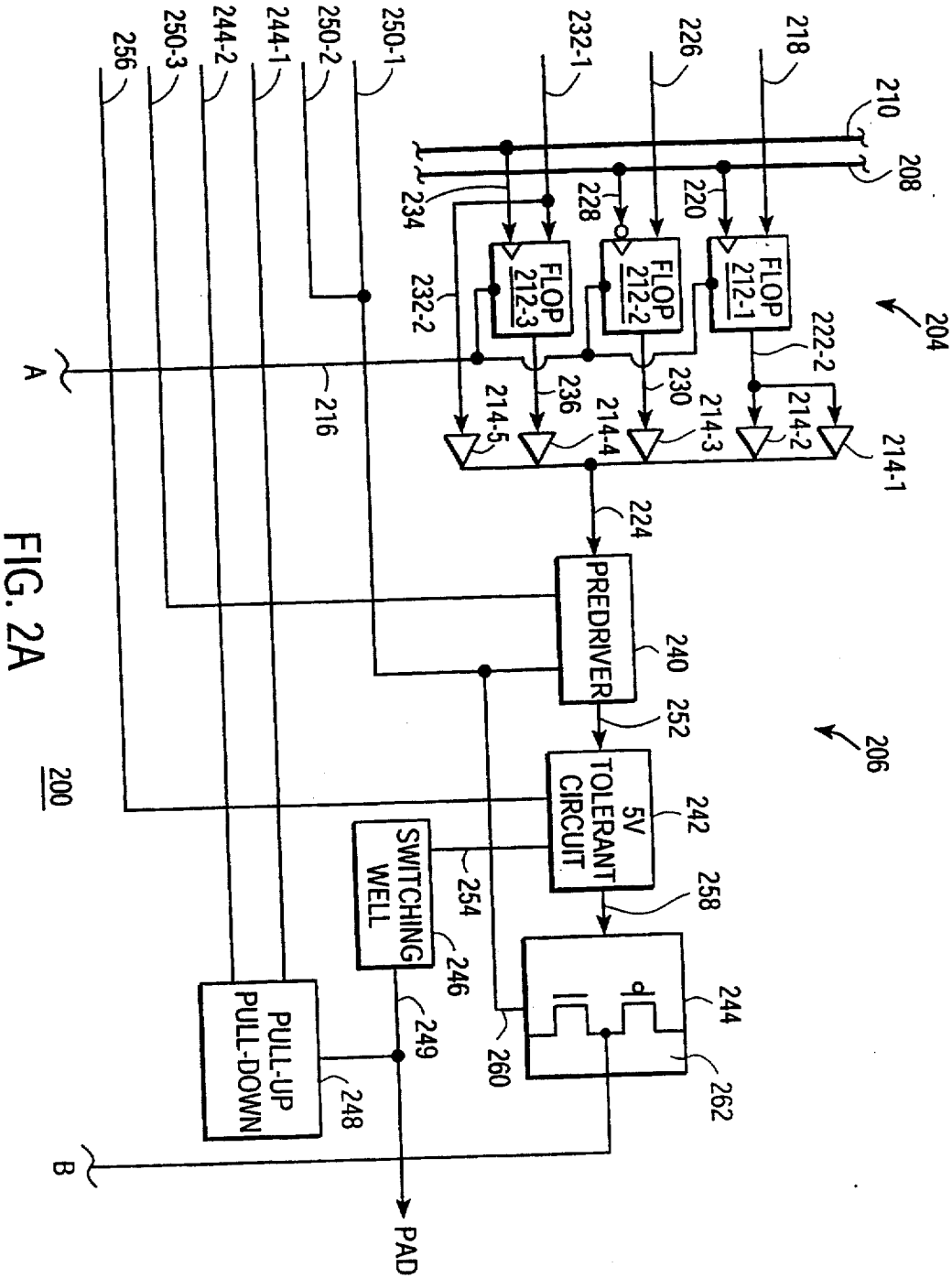

Referring to FIG. 9, there is shown a layout representation illustrating one embodiment of an I/O assembly 900 for DDR in accordance with the present invention. The I/O assembly 900 includes breaker cells 902, data cells 904, and clock trees ICK, DCK_2X, and CCK_1X, as previously described above in conjunction with FIGS. 2–7. The data cells 904 include embodiments of the data buffer 130 (not shown) previously described in conjunction with FIGS. 2A and 2B. As already noted, the vertical dashed lines indicate that additional data cells 904 may be added to the I/O assembly 900.

The breaker cells 902 are for isolating the clock trees CCK_1X, DCK_2X, and ICK, so that different protocols can be executed in synchronous mode. Again, it is noted that all three clock trees are disengaged when operating in asynchronous mode. The data cells are coupled to output clock trees DCK_2X and CCK_1X, for capturing and buffering data signals from the core 120 using DDR protocol, as described in conjunction with FIGS. 2A and 2B.

Although the present invention has been described in considerable detail with reference to certain preferred embodiments thereof, other embodiments are possible. For example, it is possible that additional protocols and signal specifications may be developed that are applicable to the present invention. Similarly, it is possible that alternative custom layouts and process technology may be used to implement the present invention. Therefore, the spirit and scope of the appended claims should not be limited to the description of the preferred embodiments herein.

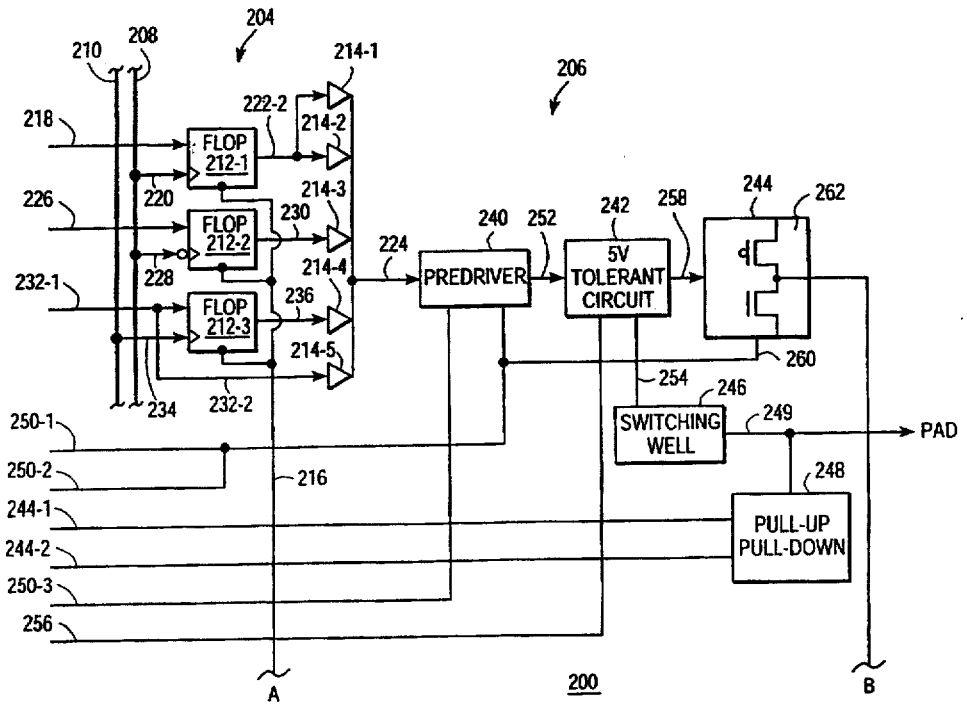

What is claimed is:

1. An I/O interface for an integrated circuit chip having a core, a pad, and a data buffer disposed between the core and the pad, the data buffer comprising:

an output circuit including:
 a plurality of output latches, each output latch having at least one input coupled to receive output data signals from the core;
 a plurality of output clock trees, each output clock tree coupled to at least one of the output latches for triggering the latching of the output data signals from the core, each output clock tree disposed in the I/O interface;
 a first signal conditioning circuit coupled to the output latches for conditioning the output data signals so that the output data signals are compliant with at least one of a plurality of protocols;

an input circuit including:
 a plurality of input latches, each input latch having at least one input coupled to receive input data signals from the pad;
 an input clock tree coupled to at least one of the input latches for triggering the latching of the input data signals from the pad; and
 a second signal conditioning circuit coupled to the input latches for conditioning the input data signals so that the input data signals are compliant with at least one of the plurality of protocols.

2. The I/O interface of claim 1, wherein the input clock tree distributes to the data buffer a clock/strobe signal generated from a source external to the I/O interface.

3. The I/O interface of claim 1, wherein the output data signals and the input data signals are conditioned by the first signal conditioning circuit and the second signal conditioning circuit, respectively, to be compliant with a protocol that is selected on-the-fly.

4. The I/O interface of claim 3, wherein the protocol is selected from the group of protocols consisting of AGP, DDR/SSTL, and PCI/TTL.

5. The I/O interface of claim 4, wherein the data buffer operates in a synchronous mode for AGP and DDR/SSTL protocols, and the data buffer operates in an asynchronous mode for PCI/TTL protocol.

6. The I/O interface of claim 1, wherein the output circuit includes a first output latch, a second output latch, and a third output latch, the first output latch and the second output latch each coupled to a first output clock tree, the third output latch coupled to a second output clock tree, the output clock trees for triggering the latching of the output data signals from the core in a synchronous manner.

7. The I/O interface of claim 6, wherein the first clock tree provides a double rate clock and the second clock tree provides a single rate clock.

8. The I/O interface of claim 6, wherein the first output latch, the second output latch, and the third output latch are edge-triggered flip-flops.

9. The I/O interface of claim 1, wherein the first signal conditioning circuit comprises:

a pre-driver having an input and an output, the input coupled to the output latches for receiving the output data signals;

a voltage tolerant circuit having an input and an output, the input coupled to the output of the pre-driver for receiving output data signals; and a driver circuit having an input and an output, the input coupled to the output of the voltage tolerant circuit for receiving the output data signals, the output of the driver circuit coupled to the pad for providing a pad voltage compliant with one of the plurality of protocols.

10. The I/O interface of claim 9, wherein the voltage tolerant circuit is further coupled to the pad via a switching well, the switching well operating in conjunction with the voltage tolerant circuit and the driver circuit to compare the pad voltage with a supply voltage and switching the higher of the two voltages to the switching well.

11. The I/O interface of claim 10, wherein the switching well is further coupled to a pull-up/pull-down circuit for adjusting the pad voltage.

12. The I/O interface of claim 11, wherein the pull-up/pull-down circuit includes a pull-up resistor and a pull-down resistor, each resistor responsive to an enabling signal from the core.

13. The I/O interface of claim 1, wherein the input circuit includes a first input latch, a second input latch, and a third input latch, each input latch coupled to the input clock for triggering the latching of the input data signals from the pad in a synchronous manner.

14. The I/O interface of claim 1, wherein the input circuit includes a Schmitt trigger coupled to the pad for receiving input data signals compliant with PCI/TTL protocol.

15. The I/O interface of claim 1, wherein the input circuit includes a differential amplifier coupled to the pad for receiving differential input data signals.

* * * * *

UNITED STATES PATENT AND TRADEMARK OFFICE
CERTIFICATE OF CORRECTION

PATENT NO.    : 6,005,412
DATED         : December 21, 1999
INVENTOR(S)   : Ranjan et al.

It is certified that error appears in the above-identified patent and that said Letters Patent is hereby corrected as shown below:

The title page showing an illustrative figure, should be deleted and substitute therefore the attached title page.

Delete Figure 2A and substitute therefore the Figure 2A as shown on the attached page.

Signed and Sealed this

Twenty-ninth Day of January, 2002

Attest:

Attesting Officer

JAMES E. ROGAN
*Director of the United States Patent and Trademark Office*

United States Patent [19]
Ranjan et al.

[11] Patent Number: 6,005,412
[45] Date of Patent: Dec. 21, 1999

[54] AGP/DDR INTERFACES FOR FULL SWING AND REDUCED SWING (SSTL) SIGNALS ON AN INTEGRATED CIRCUIT CHIP

[75] Inventors: Nalini Ranjan, Sunnyvale; Xiaoyi Guo, Santa Clara, both of Calif.

[73] Assignee: S3 Incorporated, Santa Clara, Calif.

[21] Appl. No.: 09/057,047

[22] Filed: Apr. 8, 1998

[51] Int. Cl.[6] .................................. H03K 19/0175
[52] U.S. Cl. ...................... 326/63; 326/38; 326/96; 326/86
[58] Field of Search ........................ 326/37, 38, 82, 326/83, 86, 90, 93, 95, 96, 98

[56] References Cited

U.S. PATENT DOCUMENTS

| | | | |
|---|---|---|---|
| 5,017,813 | 5/1991 | Galbraith et al. | 326/38 |
| 5,530,379 | 6/1996 | Konishi et al. | 326/68 |
| 5,646,553 | 7/1997 | Mitchell et al. | 326/37 |
| 5,736,867 | 4/1998 | Keiser et al. | 326/38 |
| 5,804,987 | 9/1998 | Ogawa et al. | 326/37 |

*Primary Examiner*—Michael Tokar
*Assistant Examiner*—Don Phu Le

*Attorney, Agent, or Firm*—Fenwick & West LLP

[57] ABSTRACT

An I/O interface includes latches, clocks, and conditioning circuits implemented in a custom physical layout to produce a reliable and flexible interface to high frequency busses running a plurality of protocols and signal specifications. Three clock trees are used to synchronize the buffering and conditioning of input/output signals before sending such signals to a pad or core. The clock trees are implemented via custom layouts to allow tight control of clock/strobe parameters (e.g., skew, duty cycle, rise/fall times). Two of the clock trees are local to the I/O interface and trigger a plurality of output latches configured on-the-fly to buffer output data signals from the core in asynchronous or synchronous mode. In the synchronous mode, a clock/strobe could be either edge-centered or window-strobe with respect to the data. The third clock tree distributes clock/strobes from an external source and is used to trigger a plurality of input latches configured on-the-fly to buffer input data from the pad in either a window-strobe mode or an edge-centered mode. The I/O interface also includes conditioning circuits that condition the I/O signals to be compliant with AGP/DDR protocols, as well as, full swing, reduced swing (SSTL), and TTL signal specifications.

15 Claims, 13 Drawing Sheets